United States Patent
Lee et al.

(10) Patent No.: US 8,577,375 B2
(45) Date of Patent: Nov. 5, 2013

(54) HANDOVER METHOD AND APPARATUS FOR MULTI-MODE MOBILE STATION

(75) Inventors: Kyung Won Lee, Suwon-si (KR); Sang Hyun Lee, Seoul (KR); Hyun Hye Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1061 days.

(21) Appl. No.: 12/217,927

(22) Filed: Jul. 10, 2008

(65) Prior Publication Data

US 2009/0017824 A1   Jan. 15, 2009

(30) Foreign Application Priority Data

Jul. 13, 2007   (KR) .................. 10-2007-0070529

(51) Int. Cl.
 *H04W 36/14*   (2009.01)
 *H04W 36/30*   (2009.01)
(52) U.S. Cl.
 USPC .......................................... 455/437; 455/436

(58) Field of Classification Search
 USPC .............. 455/436–444, 556.1; 370/331, 342, 370/449, 328
 See application file for complete search history.

(56) References Cited

U.S. PATENT DOCUMENTS

| | | | |
|---|---|---|---|
| 5,457,810 A * | 10/1995 | Ivanov et al. | 455/441 |
| 6,628,631 B1 * | 9/2003 | Mazawa et al. | 370/331 |
| 6,654,616 B1 * | 11/2003 | Pope et al. | 455/556.1 |
| 2006/0221993 A1 * | 10/2006 | Liao et al. | 370/449 |
| 2007/0161374 A1 * | 7/2007 | Kienstra et al. | 455/436 |
| 2007/0293225 A1 * | 12/2007 | Kangude et al. | 455/436 |
| 2008/0039092 A1 * | 2/2008 | Kitazoe | 455/436 |

\* cited by examiner

*Primary Examiner* — Kashif Siddiqui

(57) ABSTRACT

An improved handover method and apparatus for an Unlicensed Mobile Access (UMA) technology-enabled multi-mode mobile station is provided. A handover method of the present invention includes determining a handover during an active call session with an unlicensed wireless access network; sending a handover request message to the unlicensed wireless access network; and re-establishing, if no replay is received from the unlicensed wireless access network in a predetermined time in response to the handover request message, a connection to a licensed wireless access network for the active call session.

20 Claims, 4 Drawing Sheets

HANDOVER METHOD AND APPARATUS FOR MULTI-MODE MOBILE STATION

CROSS-REFERENCE TO RELATED APPLICATION(S) AND CLAIM OF PRIORITY

The present application claims priority to an application entitled "HANDOVER METHOD AND APPARATUS FOR MULTI-MODE MOBILE STATION" filed in the Korean Intellectual Property Office on Jul. 13, 2007 and assigned Serial No. 2007-0070529, the contents of which are incorporated herein by reference.

TECHNICAL FIELD OF THE INVENTION

The present invention relates to a multi-mode mobile station and, in particular, to an improved handover method and apparatus for an Unlicensed Mobile Access (UMA) technology-enabled multi-mode mobile station.

BACKGROUND OF THE INVENTION

Typically, licensed wireless systems such as Global System for Mobile communications (GSM), Universal Mobile Telecommunications System (UMTS), and Code Division Multiple Access (CDMA) and unlicensed wireless systems such as Wireless Fidelity (Wi-Fi) and Bluetooth are deployed in overlapping coverage areas individually. With its relatively high data rate and low maintenance cost, the popularity of unlicensed wireless systems has increased dramatically over recent years. However, the unlicensed wireless systems are limited in small service area and low mobility. In the meantime, the licensed wireless systems are advantageous in broad service areas and high mobility, in spite of low data rate and high usage cost.

Recently, with the advent of Unlicensed Mobile Access (UMA) technologies converging capabilities of licensed and unlicensed wireless technologies, UMA-enabled dual-mode handsets have been developed.

In UMA technology, a UMA Network Controller (UNC) enables access to voice, data, and other mobile services of a cellular communication system via an Access Point (AP) of an unlicensed wireless system, i.e. Wireless Local Area Network (WLAN), without modification of cellular system equipments such as Mobile Switching Center (MSC), Serving General Packet Radio Service (GPRS) Support Node (SGSN), Gateway GPRS Support Node (GGSN).

Using the UMA-enabled dual-mode handset, a subscriber can roam between cellular networks and unlicensed wireless access networks such as WLAN without breakage of ongoing voice and data services, whereby the UMA technology distributes traffic load of the cellular networks and thus improves service quality.

In the meantime, the unlicensed wireless access systems are superior to the licensed wireless access systems in data rate but limited in small service coverage and small number of users to serve simultaneously. Accordingly, it is practical to perform handover between the licensed and unlicensed wireless access networks when the UMA-enabled dual-mode handset comes within or out of the service area of the unlicensed band system.

For these reasons, there has been a need for an efficient handover technique between the licensed and unlicensed wireless access networks.

Typically, the handover from an unlicensed wireless access network to a licensed wireless access network is determined when any of conditions specified in the communication standard, e.g., when received signal strength of unlicensed wireless access network becomes less than a predetermined threshold. When a mobile station decides to trigger the handover, it sends a URR_HANDOVER_REQUIRED message to the unlicensed wireless access network.

In order to initiate the handover normally, it is required to guarantee signaling between the mobile station and the unlicensed wireless access network from sending the handover request message to receiving the handover command (URR_HANDOVER_COMMAND) message.

Accordingly, in a case where there is excessive signal loss or delay during the signaling session between the mobile station and the unlicensed wireless access network, the active call connection must be released.

SUMMARY OF THE INVENTION

To address the above-discussed deficiencies of the prior art, it is a primary object to provide an improved handover method and apparatus for a UMA system including licensed and unlicensed wireless infrastructures.

Also, the present invention provides a handover method for a UMA system that is capable of preventing an active call from being released through a connection re-establishment procedure especially when the signal quality is deteriorated due to an abrupt signal breakage or interference while the unlicensed wireless access network is serving a call service to the mobile station.

In accordance with an exemplary embodiment of the preset invention, a handover method for a multi-mode mobile station includes determining a handover during an active call session with an unlicensed wireless access network; sending a handover request message to the unlicensed wireless access network; and re-establishing, if no replay is received from the unlicensed wireless access network in a predetermined time in response to the handover request message, a connection to a licensed wireless access network for the active call session.

In accordance with another exemplary embodiment of the present invention, a handover method for a mobile station includes detecting an initiation of a handover during an active call session with an unlicensed wireless access network; determining whether an event requiring a connection re-establishment is detected after the initiation of the handover; and requesting the connection re-establishment to a licensed wireless access network.

In accordance with another exemplary embodiment of the present invention, a mobile station includes at least one antenna for exchanging signals with at least one wireless access network; a first communication module for processing communication with a licensed wireless access network; a second communication module for processing communication with an unlicensed wireless access network; and a common module for detecting an event requiring a connection re-establishment during an active call session with the unlicensed wireless access network by means of the second communication module and requesting a connection re-establishment to the licensed wireless access network by means of the first communication module.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic communication system.

In the following, a handover method and apparatus is described with a multi-mode mobile station. Particularly in the following description, the multi-mode mobile station is provided with licensed and unlicensed wireless access network interfaces.

The multi-mode mobile station is configured to perform a handover in a UMA system including licensed and unlicensed infrastructures.

The UMA is a next-generation fixed-mobile convergence technology standard which allows for seamless handover between cellular networks and fixed IP networks (hot spots). The UMA provides the mobile station with access to cellular network services over unlicensed frequency band.

The UMA-enabled mobile station can access the high speed broadband data and VoIP services over an unlicensed wireless access network such as WLAN. When no unlicensed wireless access network is available, the mobile station can connect to a licensed wireless access network, i.e., a cellular communication system. The mobile station is connected in preference to the unlicensed wireless access network through seamless handover, resulting in reduction of communication cost.

The UMA technology has been developed for enabling access to the licensed wireless access network services such as GSM, GPRS, and UMTS mobile services over the unlicensed spectrum technologies including Bluetooth and IEEE 802.11.

Figure 1:
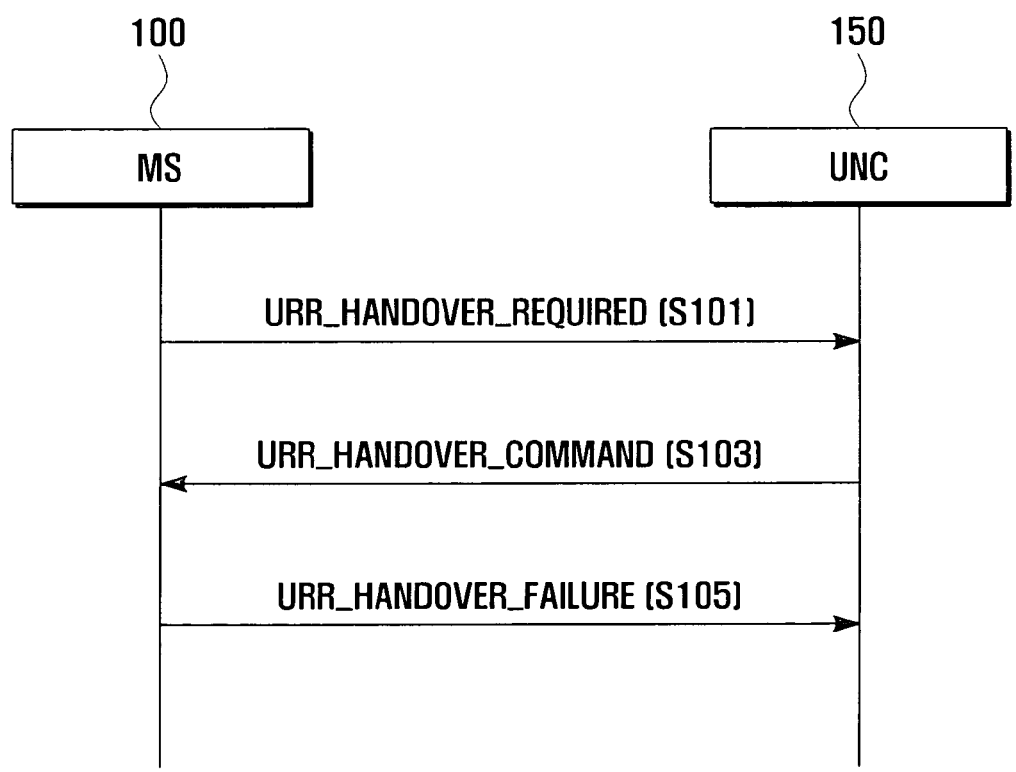
FIG. 1 is a message flow diagram illustrating a handover procedure of a handover method according to an exemplary embodiment of the present invention.

FIG. 1 is a message flow diagram illustrating a handover procedure of a handover method according to an exemplary embodiment of the present invention. In FIG. 1, it is assumed that a mobile station (MS) 100 attempts a handover from an unlicensed wireless access network to a licensed wireless access network.

Referring to FIG. 1, if a handover is required, the MS 100 sends a handover request (URR_HANDOVER_REQUIRED) message to a UMA Network Controller (UNC) 150 (S101). The MS 100 measures UMA coverage signal quality periodically and determines whether a handover is required on the basis of the measurement of the UMA coverage signal quality. When the UMA coverage signal quality is less than a predetermined threshold, the MS 100 sends the URR_HANDOVER_REQUIRED message to the UNC 150.

Upon receipt of the URR_HANDOVER_REQUIRED message, the UNC 150 signals the need for handover to a core network (CN). If the CN grants the handover, the UNC 150 sends a handover response (URR_HANDOVER_COMMAND) message to the MS 100 (S103).

If the URR_HANDOVER_COMMAND message is received, the MS 100 starts a connection establishment to a target licensed wireless access network. If the MS 100 does not succeed in establishing a connection to the target licensed wireless access network, the MS 100 sends a handover failure (URR_HANDOVER_FAILURE) message to the UNC 150 (S105).

As described above, in a UMA system in which licensed and unlicensed wireless access networks coexist, a handover from the unlicensed wireless access network to the licensed wireless access network is determined when at least one of conditions specified is satisfied, e.g., when the UMA coverage signal quality is less than a predetermined threshold.

When the MS 100 decides to trigger the handover, it sends URR_HANDOVER_REQUIRED message to the UNC 150 and starts the handover upon receipt of the URR_HANDOVER_COMMAND message from the UNC 150.

Accordingly, in order to initiate the handover-normally, it is required to guarantee successful exchange of URR_HANDOVER_REQUIRED message and URR_HANDOVER_COMMAND message between the MS 100 and the UNC 150.

In a case where there is excessive signal loss or delay during the signaling session between the MS 100 and the UNC 150, the active call connection must be released.

In this embodiment, the MS 100 requests a connection re-establishment to a licensed wireless access network when the signal quality is deteriorated due to an abrupt signal breakage or interference while communicating with UNC 150 for preventing the active call from being released.

In the following, it is assumed that the MS 100 attempts a handover from an unlicensed wireless access network to a licensed wireless access network. However, the present invention is not limited thereto.

Although the handover method and apparatus are described in association with the UMA technology, the present invention is not limited thereto. For example, the handover method and apparatus of the present invention can be applied to other Generic Access Network systems.

The licensed wireless system can be any of GSM, GPRS, Code Division Multiple Access (CDMA), and their equivalent systems. Since the above-listed communication systems are well known, detailed descriptions of them are omitted.

The unlicensed wireless system can be any of WLANs including wireless fidelity (Wi-Fi) and short range wireless networks including Bluetooth, Radio Frequency Identification (RFID), Ultra Wideband (UWB), and Zigbee.

In this embodiment, the mobile station (MS) is any of communication devices supporting UMA or GAN technology, such as mobile phones, Portable Multimedia Player (PMP), MP3 player, digital broadcast receiver, Personal Digital Assistant, Smartphone, laptop computer, Personal Computer (PC), and their equivalents, operating with communication protocols adoptable to the above-listed communication systems.

Figure 2:
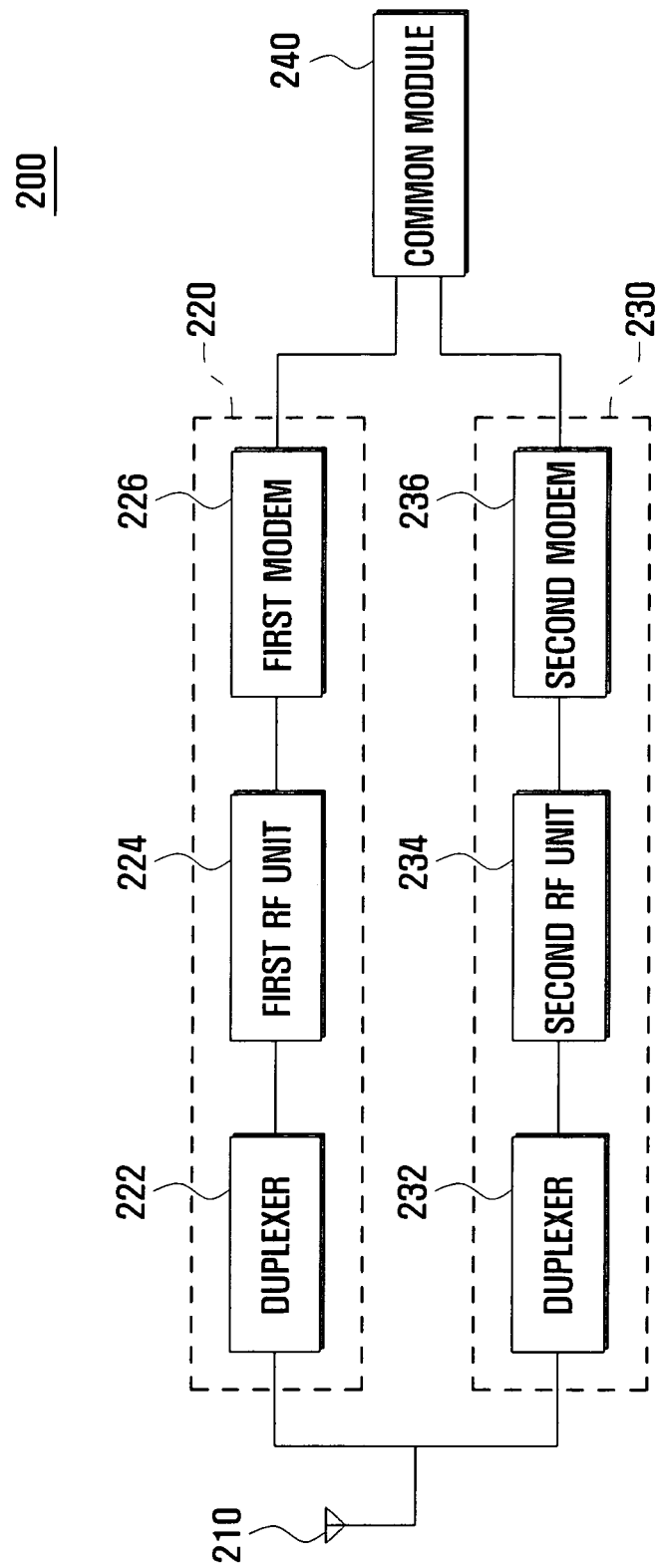
FIG. 2 is a schematic block diagram illustrating a configuration of a dual mode mobile station (MS) according to an exemplary embodiment of the present invention.

FIG. 2 is a schematic block diagram illustrating a configuration of a dual mode mobile station (MS) 200 according to an exemplary embodiment of the present invention.

Referring to FIG. 2, the MS 200 includes an antenna 210, a first communication module 220 responsible for processing licensed wireless communication, a second communication module 230 responsible for processing unlicensed wireless communication, and a common module 240 for controlling general operations and functions of the MS 200.

The antenna 210 can receive and transmit signals of licensed frequency band and unlicensed frequency band. Although a single antenna is depicted in FIG. 2, the MS 200 can be implemented with two antennas responsible for the licensed and unlicensed frequency bands respectively.

The first communication module 220 includes a duplexer 222 operating as a band pass filter and separating transmission and reception frequencies, a first radio frequency (RF) unit 224, and a first modem 226 for processing licensed frequency band communication protocols. Particularly in this embodiment, the first communication module 220 can be a licensed frequency band communication module for processing the services provided by the licensed wireless access network.

The second communication module 230 includes a duplexer 232 operating as a band pass filter and separating transmission and reception frequencies, a second RF unit 234, and a second modem 236 for processing unlicensed frequency band communication protocols. Particularly in the embodiment, the second communication module 230 can be an unlicensed frequency band communication module for processing the services provided by the unlicensed wireless access network.

The common module 240 controls the operations of the first and second communication modules 220 and 230 and general operations and functions of the MS 200. The common module 240 includes an application processor responsible for multimedia function, a memory, an input/output unit, other application processor, and a controller for controlling signaling between the internal components.

If an incoming call is requested by a communication system or an outgoing call is requested by a user, the common module 240 determines which communication network is associated with the incoming or outgoing call and controls an establishment of a connection channel to a communication network by means of the first communication module 220 or the second communication module 230 according to the communication network determination result.

For example, if the incoming or outgoing call is requested in association with the licensed wireless access network, the common module 240 controls the first communication module 220 to establish a communication channel via the licensed wireless access network. In a case that the calls are requested in association with both the licensed and unlicensed wireless access networks, the common module 240 selects one of the two networks in a predetermined priority order.

The common module 240 controls the operations of the first and second communication modules 220 and 230 according to the status of the communication services. For this purpose, the common module 240 is provided with software modules called software entities. The software entities (licensed wireless access control entities and unlicensed wireless control entities) may reside on the controller.

Particularly in this embodiment, the common module 240 detects an error factor causing the connection re-establishment. That is, the common module 240 detects a local release situation of a call which is caused by a degradation of electric field of the radio link rather than by normal signaling. The local release can occur, for example, when the MS moves away from an access point before receiving the handover command message.

If a local release situation is detected, the common module 240 attempts to access the licensed wireless access network in which the MS 200 is located for requesting connection re-establishment. After requesting the connection re-establishment, the common module 240 may continue AP-scanning during a predetermined period (e.g., one minute) set in the system design stage so as to perform handover to another AP. Here, after the period has lapsed, the common module 240 performs a normal AP scan procedure specified in the communication standard.

That is, if the received signal strength or the signal quality of a serving cell (e.g., Unlicensed Mobile Access Network; UMAN) is abruptly weakened or no signal is received in a predetermined time period after transmitting the URR_HANDOVER_REQUIRED message, the common module 240 of the MS 200 attempts a connection re-establishment to a licensed wireless network (e.g., GSM EDGE Radio Access Network; GERAN).

In such case that it is difficult to maintain an active call though a normal handover procedure due to the temporary deterioration of the radio link to the unlicensed wireless access network, the common module 240 of the MS 200 requests the connection re-establishment to the licensed wireless access network, thereby reducing frequency of call release, resulting in improvement of service quality and performance of the MS.

The first and second communication modules 220 and 230 are provided with a licensed wireless access network interface and an unlicensed wireless access network interface so as to establish connections to the licensed and unlicensed wireless access network through the respective interfaces under the control of the common module 240.

As described above, the MS 200 according to an embodiment, of the present invention can operate in two communication modes.

The MS 200 can be configured such that the first and second communication modules 220 and 230 are activated simultaneously when it turns on. Also, the MS 200 can be configured such that one of the two communication modules 220 and 230 is activated in a preset priority order. In this case, if the communication module activated first does not discover a corresponding network, the other communication module is activated to discover an appropriate network. In such manner, the MS 200 can process the services provided by the licensed and unlicensed wireless access networks simultaneously.

In this embodiment, the MS 200 can be configured to have a preferable communication system mode such that one of the first and second communication modules 220 and 230, which is responsible for the preferable communication system, is activated to establish a connection to the corresponding wireless access network.

The MS 200 can be configured such that the first and second communication modules 220 and 230 are activated adaptively to the network environment, whereby one or two of the communication modules can be activated at a time. The operation options can be configured on a communication settings menu provided through the user interface.

Although the operations of the MS are described in connection with specific exemplary wireless access networks, the present invention is not limited thereto. For example, the MS can be implemented with more than two network interfaces allowing different wireless access networks that are currently deployed and will be developed in the near future.

Until now, the internal components of the MS and their functions are schematically described. A seamless handover method for the above structured MS between licensed and unlicensed wireless access networks is described hereinafter. However, the present invention is not limited to the exemplary embodiment described hereinafter, but various changes in form and details may be made therein.

Figure 3:
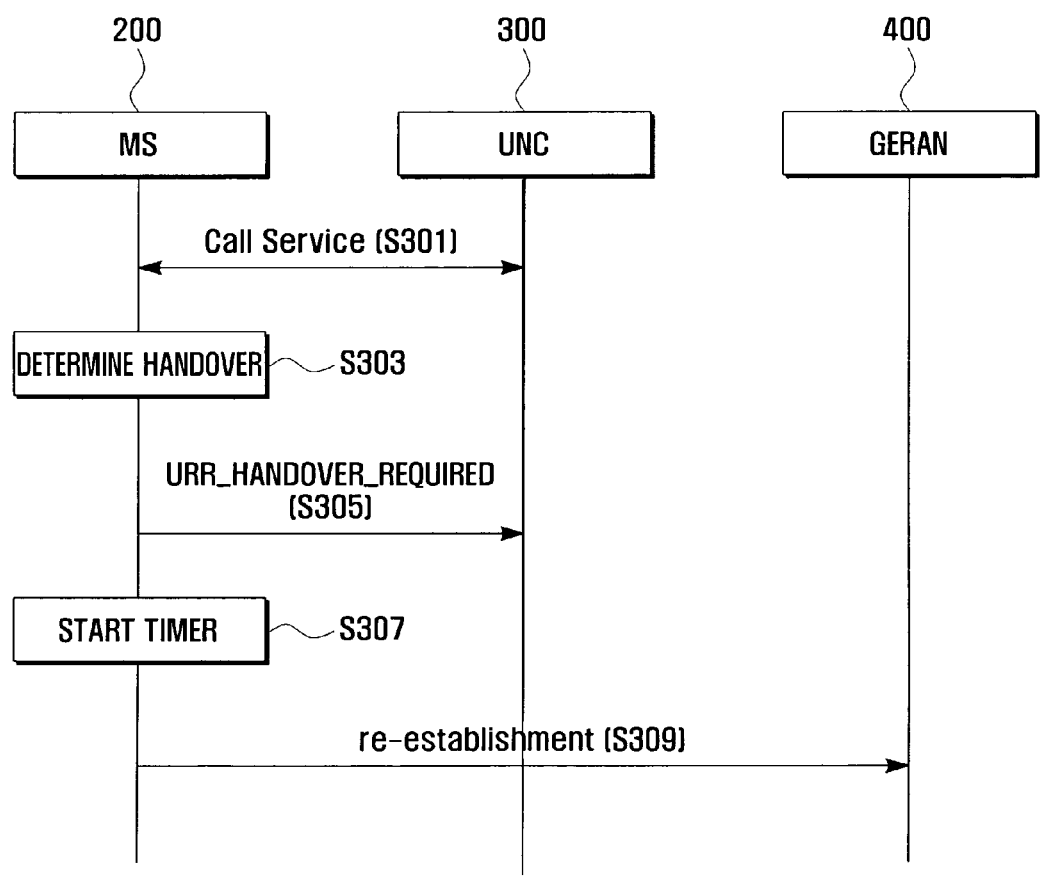
FIG. 3 is a message flow diagram illustrating a handover method according to an exemplary embodiment of the present invention.

FIG. 3 is a message flow diagram illustrating a handover method according to an exemplary embodiment of the present invention. In FIG. 1, it is assumed that an MS 200 attempts a handover from an unlicensed wireless access network to a licensed wireless access network while receiving an active call service from a UNC 300 of the unlicensed wireless access network.

Referring to FIG. 3, while the MS 200 is engaged in an active call via the UNC 300 (S301), it determines a handover (S303). The handover is determined on the basis of the received signal strength from the UNC 300 of the unlicensed wireless access network. That is, the MS 200 measures the received signal strength or coverage signal quality of the UNC 300 and compares the measurement with a predetermined threshold such that the handover is determined on the basis of the comparison result. The handover can be determined by the MS 200 or UNC 300 according to the system design. In this embodiment, a case in which the MS 200 determines a handover is described as an example.

If the MS. 200 determines a handover at step S303, it sends a handover request (URR_HANDOVER_REQUIRED) message to the UNC 300 (S305) and starts a timer for counting a transmission time (S307). The timer is used for restricting a waiting time for receiving a handover response (URR_HANDOVER_COMMAND) message from the UNC 300 in response to the URR_HANDOVER_REQUIRED message.

If no URR_HANDOVER_COMMAND message is received from the UNC 300 until the timer has expired, the MS 200 sends a connection re-establishment message to a GERAN 400 of the licensed wireless access network rather than the UNC 300 (S309).

As described above, when it is determined that the handover is unavailable through a normal handover procedure due to the abrupt channel quality deterioration (caused by channel interferences) between the MS 200 and UNC 300, the MS 200 attempts a connection re-establishment to the licensed wireless access network for protecting the active call release.

Figure 4:
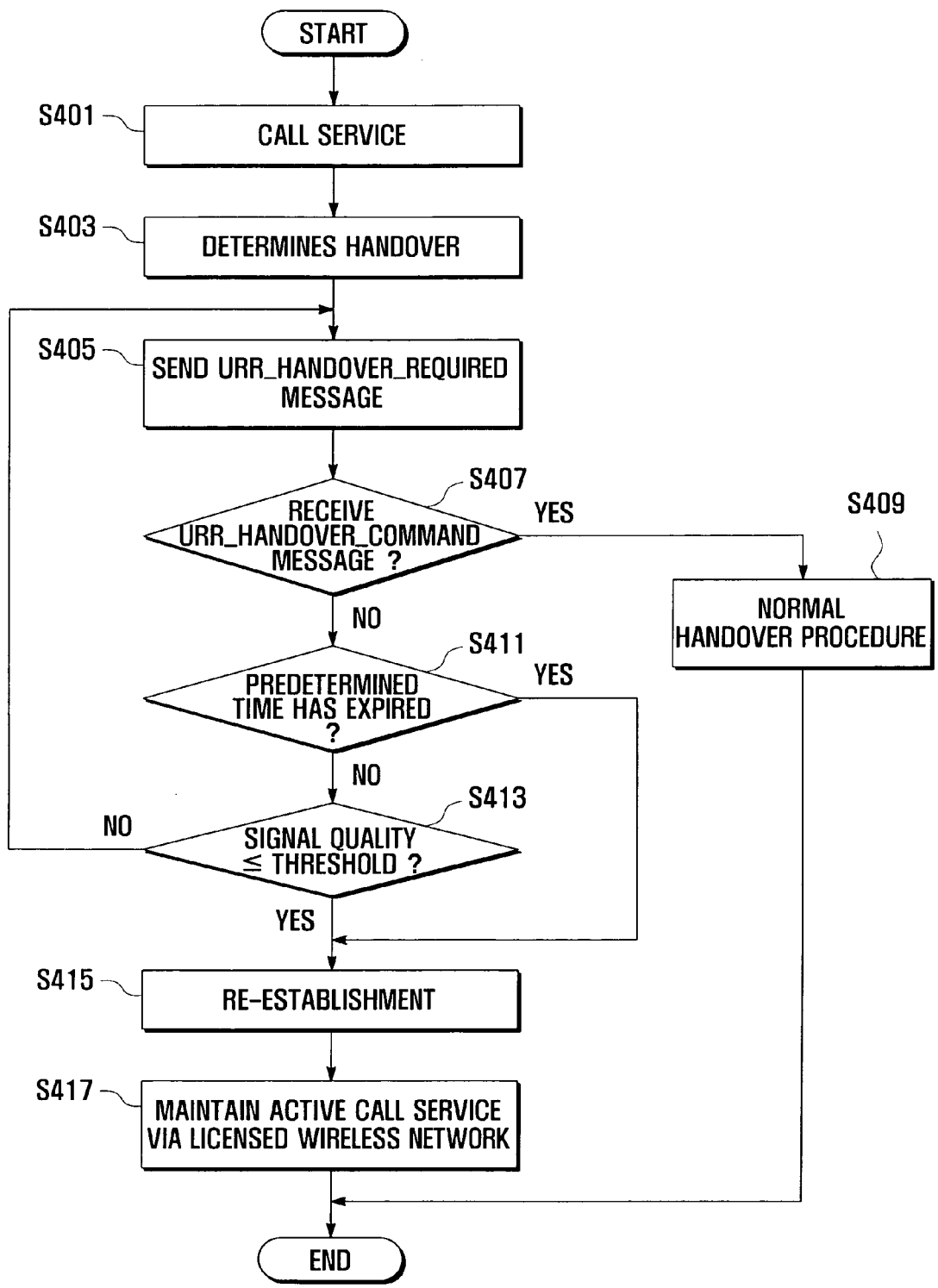
FIG. 4 is a flowchart illustrating a handover method according to an exemplary embodiment of the present invention.

FIG. 4 is a flowchart illustrating a handover method according to an exemplary embodiment of the present invention.

Referring to FIG. 4, an MS is engaged in an active call over an unlicensed wireless access network (UNC) (S401). During the active call session, the MS determines a handover is necessary (S403). At this time, the handover determination is performed according to the normal handover procedure specified in the communication standard. The MS measures the received signal strength of the unlicensed wireless access network and determines a handover on the basis of whether the measured received signal strength is less than a predetermined first threshold value.

If the MS determines a handover on the basis of the received signal strength, it sends a handover request (URR_HANDOVER_REQUIRED) message to the unlicensed wireless access network (S405) and determines whether a handover response (URR_HANDOVER_COMMAND) message is received from the unlicensed wireless access network in a predetermined time (S407).

If a URR_HANDOVER_COMMAND message is received from the unlicensed wireless access network, the MS performs the handover in a normal handover procedure (S409) and, otherwise, determines whether the predetermined time has expired (S411).

In a case that no URR_HANDOVER_COMMAND message is received in the predetermined time, the MS sends a connection re-establishment message to a licensed wireless access network (e.g., GERAN) (S415).

If the predetermined time has not expired, the MS determines whether the received signal strength (or signal quality) is less than a second threshold value (S413). That is, the MS measures the received signal strength of the unlicensed wireless network and compares the received signal strength with the second threshold value. Here, the second threshold value may be less than the first threshold value. The first and second threshold values are set in the system design stage.

The second threshold value may be used for determining whether a handover is available. Accordingly, if the received signal strength is less than the second threshold value, the MS judges that an error has occurred such that normal signaling with the unlicensed wireless access network is impossible. In this case, the MS sends a connection re-establishment message to the licensed wireless access network (S415). The error may include situations of a local release of an active call due to the deterioration of electric field of the radio link, signaling breakage with the unlicensed wireless network, and signal loss due to channel interferences.

After requesting the connection re-establishment, the MS may continue AP-scanning during a predetermined period (e.g., one minute) to perform a handover to another AP while signaling with the licensed wireless access network. After the period has lapsed, the MS performs a normal AP scan procedure specified in the communication standard.

After connection re-establishment is successfully done, the MS maintains the active call service over the unlicensed wireless access network without local release (S417).

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the handover method and apparatus for a multi-mode mobile station according to the present invention enables the mobile station performs a handover between licensed and unlicensed wireless access network efficiently. Particularly, the handover method and apparatus of the present invention can prevent an active call service from being released by re-establishing a connection to a licensed wireless access network when handover-related signaling failure between the mobile station and the unlicensed wireless access network, resulting in improvement of communication reliability and service quality.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A handover method for a multi-mode mobile station, comprising:
   determining a handover during an active call session with an unlicensed wireless access network;
   sending a handover request message to the unlicensed wireless access network;
   determining whether a handover command message is received from the unlicensed wireless access network within a predetermined time;
   determining whether a signal quality of the unlicensed wireless network is greater than a predetermined threshold in response to determining that the handover command message is not received and the predetermined time has not expired; and
   re-establishing a connection to a licensed wireless access network for the active call session when at least one of the predetermined time has expired before the handover command message is received and the signal quality of the unlicensed wireless network is not greater than the predetermined threshold.

2. The handover method of claim 1, further comprising:
   wherein determining whether the handover command message is received from the unlicensed wireless access network within the predetermined time comprises:
      determining whether the handover command message is received in response to the handover request message;
      determining, when the handover command message is not received, whether the predetermined time has expired, and
      judging, when the predetermined time has expired without receipt of the handover command message, that a handover via the unlicensed wireless network is unavailable; and
   wherein re-establishing the connection to the licensed wireless access network for the active call session comprises requesting a re-establishment of a connection to the licensed wireless access network.

3. The handover method of claim 2, wherein determining whether the signal quality of the unlicensed wireless network is greater than the predetermined threshold comprises:
   measuring a received signal strength of the unlicensed wireless network; and
   determining whether the received signal strength is greater than the predetermined threshold.

4. The handover method of claim 3, further comprising re-sending the handover request message to the unlicensed wireless access network when the received signal strength of the unlicensed wireless network is greater than a threshold.

5. The handover method of claim 3, further comprising scanning for discovering access points for at least one unlicensed wireless access network during a predetermined scan time period after requesting the re-establishment.

6. The handover method of claim 1, further comprising initiating, when the handover command is received from the unlicensed wireless access network within the predetermined time, a handover to the licensed wireless access network via the unlicensed wireless access network.

7. A handover method for a mobile station, comprising:
   detecting an initiation of a handover during an active call session with an unlicensed wireless access network;
   determining whether a signal quality of the unlicensed wireless network is greater than a predetermined threshold when a handover command message is not received and a predetermined time has not expired; and
   requesting the connection re-establishment to a licensed wireless access network when at least one of the predetermined time has expired before the handover command message is received and the signal quality of the unlicensed wireless network is not greater than the predetermined threshold.

8. The handover method of claim 7, wherein determining whether a signal quality of the unlicensed wireless network is greater than the predetermined threshold comprises:
   measuring a received signal strength of the unlicensed wireless network; and
   comparing the received signal strength with the predetermined threshold.

9. The handover method of claim 7, wherein detecting the initiation of the handover during the active call session with the unlicensed wireless access network comprises:
   determining whether a handover is required;
   sending, when a handover is required, a handover request message to the unlicensed wireless access network; and
   determining whether a handover response message is received within the predetermined time in response to the handover request message.

10. The handover method of claim 9, further comprising scanning for discovering access points for at least one unlicensed wireless access network during a predetermined scan time period after requesting the re-establishment.

11. A mobile station comprising:
    at least one antenna configured to exchange signals with at least one wireless access network;
    a first communication module configured to process communication with a licensed wireless access network;
    a second communication module configured to process communication with an unlicensed wireless access network; and
    a common module configured to detect an initiation of a handover during an active call session with the unlicensed wireless access network, determine whether a signal quality of the unlicensed wireless network is greater than a predetermined threshold when a handover command message is not received and a predetermined time has not expired, and requesting a connection re-establishment to the licensed wireless access network when at least one of the predetermined time has expired before the handover command message is received and the signal quality of the unlicensed wireless network is not greater than the predetermined threshold.

12. The mobile station of claim 11, wherein the common module, when determining whether the signal quality of the unlicensed wireless network is greater than the predetermined threshold, is further configured to measure a received signal strength of the unlicensed wireless access network, and compare the received signal strength with the predetermined threshold.

13. The mobile station of claim 12, wherein the common module is further configured to send a handover request message to the unlicensed wireless network when the received signal strength of the unlicensed wireless network is greater than a threshold.

14. The mobile station of claim 11, wherein the common module is further configured to scan for discovering access points at least one unlicensed wireless access network during a predetermined scan time period after requesting the re-establishment.

15. The handover method of claim 1, wherein the licensed wireless access network is one of GSM (Global System for Mobile communications), GPRS (General Packet Radio Service), and CDMA (Code Division Multiple Access).

16. The handover method of claim 1, wherein the mobile station is one of a mobile phone, a portable multimedia play, a smart phone, a personal digital assistant, a laptop computer, and a personal computer.

17. The handover method of claim 7, wherein the licensed wireless access network is one of GSM (Global System for Mobile communications), GPRS (General Packet Radio Service), and CDMA (Code Division Multiple Access).

18. The handover method of claim 7, wherein the mobile station is one of a mobile phone, a portable multimedia play, a smart phone, a personal digital assistant, a laptop computer, and a personal computer.

19. The mobile station of claim 11, wherein the licensed wireless access network is one of GSM (Global System for Mobile communications), GPRS (General Packet Radio Service), and CDMA (Code Division Multiple Access).

20. The mobile station of claim 11, wherein the mobile station is one of a mobile phone, a portable multimedia play, a smart phone, a personal digital assistant, a laptop computer, and a personal computer.

\* \* \* \* \*